United States Patent [19]

Dudley et al.

[11] 4,441,809
[45] Apr. 10, 1984

[54] METHOD AND APPARATUS FOR DETERMINING POSITION

[76] Inventors: James R. Dudley, 27 Colville Rd., Walthamstow, London E17; Barry J. Gorham, 55 Roundmead Ave., Loughton, Essex, both of England

[21] Appl. No.: 269,044
[22] PCT Filed: Oct. 16, 1980
[86] PCT No.: PCT/GB80/00169
§ 371 Date: May 29, 1981
§ 102(e) Date: May 29, 1981
[87] PCT Pub. No.: WO81/01195
PCT Pub. Date: Apr. 30, 1981

[30] Foreign Application Priority Data

Oct. 16, 1979 [GB] United Kingdom ............... 7935790
Apr. 2, 1980 [GB] United Kingdom ............... 8011177

[51] Int. Cl.³ ............................ G01C 3/10; G01C 3/08
[52] U.S. Cl. ........................................ 356/1; 356/4; 356/152
[58] Field of Search ............................ 356/1, 4, 141, 152

[56] References Cited

U.S. PATENT DOCUMENTS 3,147,384  9/1964  Fenton et al. ................... 356/141
3,469,919  9/1969  Zellner ............................ 356/4
3,620,626  11/1971 Daly ................................ 356/4
3,714,657  1/1973  Lapeyre .
4,218,834  8/1980  Robertsson ..................... 356/152
4,268,167  5/1981  Alderman ........................ 356/1

FOREIGN PATENT DOCUMENTS

2441275  3/1976  Fed. Rep. of Germany .
2410254  6/1979  France .
1536547  8/1975  United Kingdom .

Primary Examiner—S. C. Buczinski
Attorney, Agent, or Firm—Cushman, Darby & Cushman

[57] ABSTRACT

Position sensing apparatus comprises generating means (12) for generating a beam of radiation; rotation means (24) for rotating the beam about a vertical axis to define a horizontal reference plane, the beam having a sectional shape (for example "V" shape or "X" shape) such that a leading edge and a trailing edge are straight and diverge away from the reference plane; two radiation sensors (38, 40) spaced a known vertical distance apart; and means (30, 32, 44, 46) for determining the distances between the leading and trailing edges at the positions along those edges which pass across each sensor. The vertical distance of each sensor from the horizontal reference place and the distance of the sensors from the axis of rotation can then be determined.

8 Claims, 13 Drawing Figures

METHOD AND APPARATUS FOR DETERMINING POSITION

This invention relates to the determination of position with respect to a reference point or reference plane and will usually be applied in the field of land surveying, but other applications are also possible.

In land surveying it is known to make measurements of height, distance and angular position with respect to a known reference point using three separate instruments.

For example, in one instrument a laser beam is rotated to sweep out a horizontal reference plane which is located at a distant point either by a self-seeking sensor which can travel vertically on a portable staff held by an operator or by use of the human eye. Height above or below this plane can then be read from a scale and recorded manually by the operator. Subsequently, the distance and angular position of the location are measured by, respectively, an electromagnetic distance meter and theodolite, and recorded manually. While the laser-based instrument can be operated by one man, the other two devices must be operated by two people.

In one embodiment of apparatus according to the present invention, all three measurements can be made by one operator using a single two-part instrument.

According to the invention, position sensing apparatus comprises generating means for generating a beam of radiation; rotation means for rotating the beam to define a reference plane, the beam having an effective sectional shape such that a leading edge and trailing edge are straight and diverge from each other on at least one side of the reference plane; at least two radiation sensors spaced a known distance apart in a direction parallel to the axis of rotation of the beam; and means for determining the distances between the leading and trailing edges at the positions along those edges which pass across each radiation sensor, whereby the distance of each sensor from the reference plane and the distance of the sensors from the axis of rotation can be determined.

For example, a beam of visible radiation may be rotated about a vertical axis to define a horizontal reference plane, the beam having an actual section which is "V" shaped or which forms a multiplication cross.

Consider the case of a V-shaped beam of visible radiation, for example from a laser source, sweeping across two vertically-spaced sensors. The distance between the leading and trailing edges of the beam is greater at the upper sensor than at the lower sensor. If a measure is made of these distances, the distance of either sensor from the horizontal reference plane and of their distance from the axis of rotation can be calculated.

The beam cross section may comprise two thin arms each defining one side of the "V" and constituting respectively the leading and the trailing edge (although each thin arm will have its own leading and trailing edge), or the beam section may be fan shaped, forming effectively a solid inverted triangle. Alternatively, a beam section in the shape of a multiplication cross may be used.

When two thin arms are used to provide the leading and trailing edges, they may be closely adjacent so that if the beam cross section is examined a "V" or "X" shape is visible. Alternatively, in certain circumstances the trailing edge may be rotated 180° behind the leading edge.

In many circumstances it will be an acceptable approximation to measure not the distance between the edges at each sensor but the angle subtended by that distance at the axis of rotation, provided the angle is small, e.g. 5 degrees or less. This measurement can be achieved by further providing means to generate a train of pulses, each pulse corresponding to an equal subdivision of the 360° rotation of the beam, and pulse counting means for counting the number of pulses generated between passage of the leading and trailing edges of the rotating beam at each sensor.

A further measurement is also possible. By providing means for generating a reference pulse at a fixed angular position with respect to rotation of the beam, and pulse counting means for counting the number of pulses generated between the reference pulse and a position midway between the leading and trailing edges at one sensor, the angular distance of that sensor from a direction corresponding to the reference pulse can be determined.

The invention will now be described by way of example with reference to the accompanying drawings in which:

FIG. 8 illustrates a V-beam geometrical arrangement;

Figure 1:
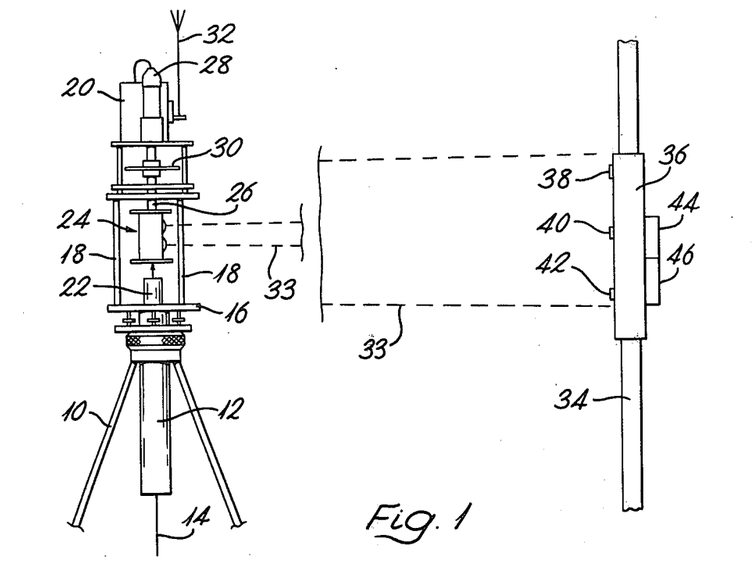
FIG. 1 is a general highly schematic view of a prototype two-part land surveying instrument according to the invention.

In FIG. 1 a first part of a land surveying instrument comprises a tripod 10 supporting a laser 12 which is arranged to emit its beam vertically upwards and which can be plumbed by a plumb line 14. The tripod 10 supports a carriage consisting of a base 16, three narrow vertical support bars 18 and an upper part 20. The base 16 carries a beam expander 22 through which the vertical beam from the laser 12 passes to a rotatable optical unit 24 which is rotated via axle 26 by a motor 28, the axle also carrying a divided circle or digitiser disc 30. The motor 28 is supported by the upper part 20 which also carries a radio antenna 32. In operation the beam from laser 12 is modified by the optical unit 24 to give a horizontal beam of laser light 33 of the required cross sectional shape which is rotated to sweep out a horizontal plane. As the beam is rotated, the digitiser disc 30 provides a digital signal related to the angular position and this signal is used to modulate a radio frequency signal emitted by the antenna 32. In the prototype the support bars 18 interrupt the beam. Rearrangement of the apparatus would eliminate this disadvantage.

The second part of the instrument comprises a surveyor's staff 34 on which slides a cursor 36 carrying three equispaced light sensors 38, 40, 42, a radio frequency receiver 44 and an electronic circuit 46 which includes a microprocessor. In use, the modulated RF signal is received by receiver 44 and the pulse signals are supplied to the circuit 46 which includes several pulse counters (not illustrated separately). The light sensors 38, 40, 42 provide start and stop signals to the circuit 46 as the laser beam sweeps over them, and the counters are operated in accordance with these signals.

Figure 2:
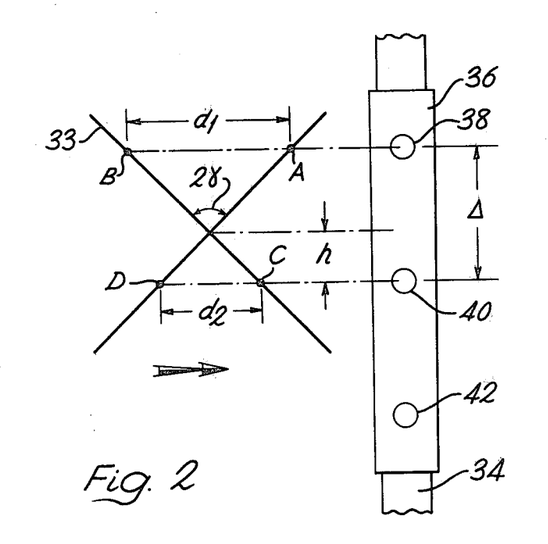
FIG. 2 is a partial view of one part of the instrument and illustrates measurement of height.

FIG. 2 shows the face of the staff 34 which receives the rotated beam 33, and also illustrates one example of beam cross section, that is, a multiplication cross. As the beam sweeps across the staff 34 from left to right as indicated by the arrow, the upper leading edge of the beam reaches the upper sensor 38, and reception of the beam causes the corresponding (first) pulse counter to start counting. The lower leading edge then reaches sensor 40 and the corresponding (second) pulse counter starts counting, then is switched off when the lower trailing edge reaches sensor 40, and finally the upper trailing edge reaches the sensor 38 and switches off the first counter. The appropriate parts of the beam edges are referenced A, B C and D.

From the geometry of the Figure it is clear that the distance $d_1$ from A to B is greater than the distance $d_2$ from C to D. If the vertical distance between the sensors is $\Delta$ and the vertical distance from the centre of the X-shaped beam to sensor 40 is h, then by simple geometry:

$$\frac{d_1}{d_2} = \frac{\Delta - h}{h} \text{ therefore} \quad (1)$$

$$h = \frac{\Delta}{\left(\frac{d_1}{d_2} + 1\right)}$$

Figure 3A:
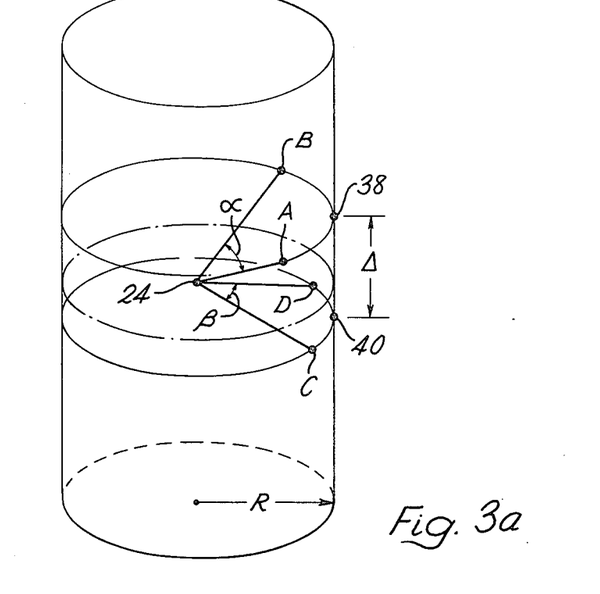
FIGS. 3a, 3b and 3c illustrate the optical geometry of FIGS. 1 and 2.
Figure 3B:
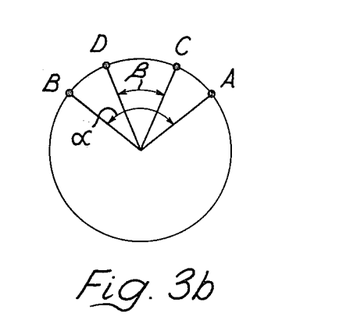
Figure 3C:
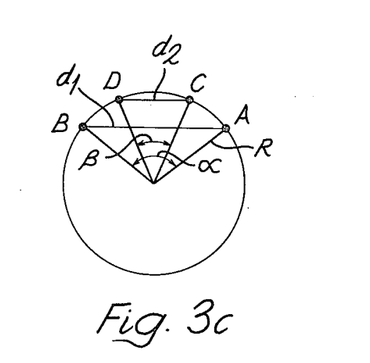

The centres of rotation of the leading and trailing edges at A, C and B, D are coincident at the optical unit 24, and the solid geometry of the arrangement according to the invention is illustrated in FIG. 3. In FIG. 3(a) the optical unit 24 is at the centre of a cylinder of radius R determined by the distance of the sensors 38, 40. The loci of points A, B, C and D also lie on the cylindrical surface. The centre of the rotated beam sweeps out a horizontal plane; the sensor 38 is above this plane and the points A, B on the rotated beam subtend an angle $\alpha$ at the optical unit 24. Similarly at the sensor 40 below the centre of the beam the points C, D subtend an angle $\beta$. However by the subtense bar principle, the angles $\alpha$ and $\beta$ projected onto the horizontal plane corresponding to the centre of the beam are unchanged in value, and the geometrical relationship illustrated in FIG. 3(b) holds. In practice the loci of points A, B, C and D are the arcs AB and CD, but since the distance R of the sensors from the optical unit is much greater than the sensor vertical spacing $\Delta$ so that the angles $\alpha$ and $\beta$ are small, (they are shown as large angles for clarity) the arcs can be approximated by the chords as shown in FIG. 3(c) with little loss of accuracy; usually the angles will be less than 5 degrees and often less than 3 degrees.

The counts stored in the two counters relate precisely to the angles $\alpha$ and $\beta$; from FIG. 3(c) it will be seen that:

$$d_1 = 2R \sin(\alpha/2)$$

and $$d_2 = 2R \sin(\beta/2)$$

substituting in equation (1):

$$h = \frac{\Delta}{\left[\frac{\sin(\alpha/2)}{\sin(\beta/2)} + 1\right]} \quad (2)$$

Since the angles are so small that the chords are approximated by the arcs, it is also an acceptable approximation to use the ratio of the angles in radians instead of the ratio of the sines of the angles.

The electronic circuit 46 includes a microprocessor which, from the counts in the two pulse counters and a stored measure of distance $\Delta$ can calculate by application of equation (2) the distance of either sensor 38, 40 from the horizontal plane defined by the centre of the X-shaped beam.

It is also possible to calculate the range R. Referring again to FIG. 2, if the angle between the upper arms of the X-shaped beam is $2\gamma$, then:

$$d_2 - d_1 = 2h \tan \gamma - 2(\Delta - h) \tan \gamma$$

But from FIG. 3(c)

$$d_2 - d_1 = 2R(\sin \beta/2 - \sin \alpha/2)$$

Rearranging:

$$R = \frac{\Delta \tan \gamma}{\left(\sin \frac{\alpha}{2} + \sin \frac{\beta}{2}\right)} \quad (3)$$

Thus the microprocessor in circuit 46 can, from the counts giving measures of angles $\alpha$ and $\beta$ and from stored values of $\Delta$ and $\gamma$, calculate the distance from the optical unit 24 to the staff 34 carrying sensors 38 and 40.

The third measurement which is commonly required in surveying is the angular distance of the staff from a fixed horizontal direction passing from the optical unit 24 to a reference object. This can also be measured in terms of the pulse counts of angular position provided by the digitiser disc 30. The disc is arranged to transmit a reference pulse at one fixed angular position during each rotation. The staff 34 is then placed at the required position of the nominal reference object. When a reference pulse is received, a counter in the circuit 46 is started and counts pulses from the radio signal until the leading edge of the laser beam triggers the associated sensor; the counter is arranged to subsequently count alternate pulses until the trailing edge is received when the counter stops counting. The stored count then corresponds to the angle between the direction set by the reference pulse and the position of the detector at the nominal reference position plus the half-count between the leading and the trailing edge of the laser beam which corresponds to a correction to bring the measured angle to that at the centre of the X-shaped beam, i.e. as if a sensor on the horizontal plane defined by this central point had been used to terminate the count.

Measurement can then be made of the angular distance of any field point with respect to the reference pulse direction and then a value with respect to the nominal reference object obtained by subtracting the total pulse counts. A negative result is corrected by adding the count corresponding to an angle of $2\pi$. It is an advantage that the reference object does not have to be aligned with the notional direction of the reference pulse.

Thus the three variables of height, range and angle have been measured by one instrument using pulse counts plus stored constants. The part of the apparatus which provides the rotating beam can be left unattended in a central position while a surveyor walks the ground taking readings at the positions he selects. The microprocessor on the staff 34 makes a measurement at each position which can then be recorded. Since the calculation is performed at the staff, the instrument can be used not just to make surveying measurements, but also during the process of "setting out", i.e. when markers must be placed at ground positions corresponding to plan positions.

Figure 4:
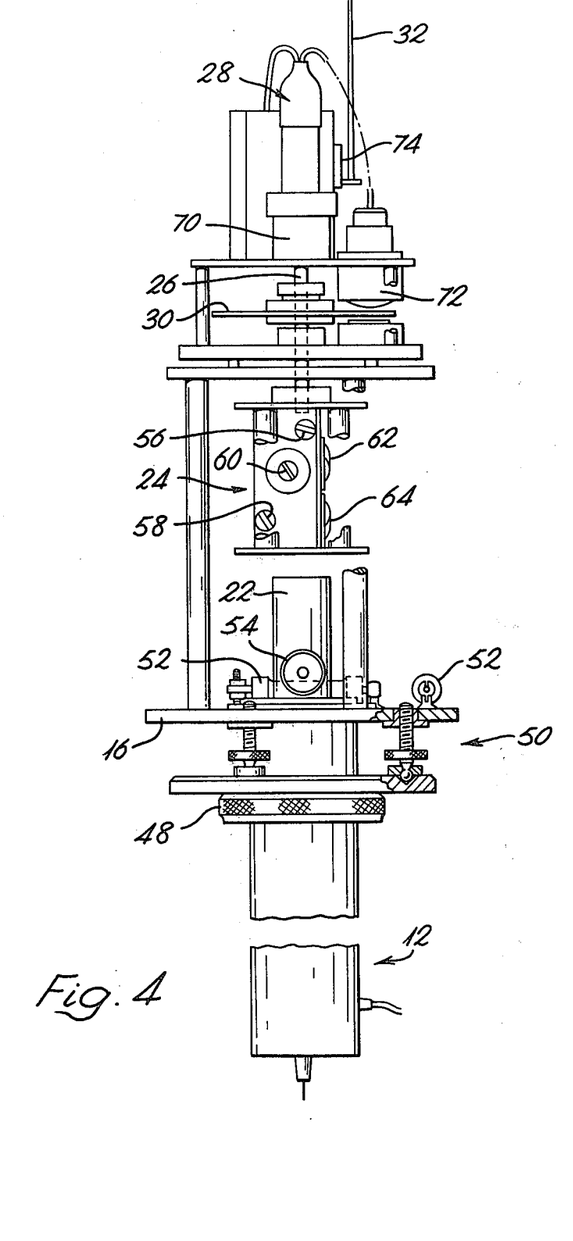
FIG. 4 is a detailed view of the beam-generating apparatus.

Considering the apparatus in more detail, FIG. 4 shows the laser 12 attached to the base 16 by a tripod mounting 48; the beam expander 22 is supported by a tribrach assembly 50 which incorporates two spirit bubble levels 52 and the expander has a focus control 54.

Figure 5:
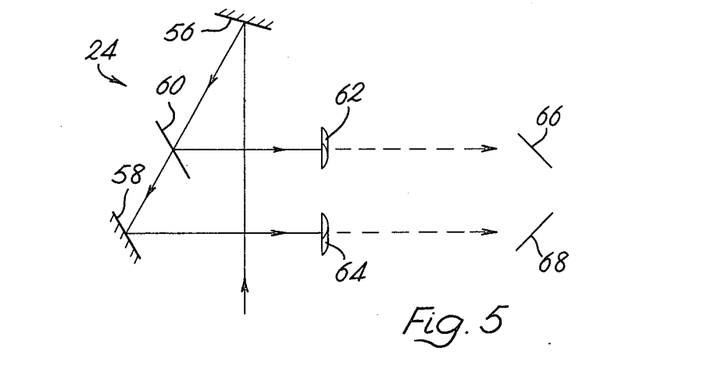
FIG. 5 is a ray diagram showing production of a beam of X-shaped cross section.

The optical unit 24, which is illustrated in the ray diagram of FIG. 5, consists of first and second front-silvered mirrors 56, 58, a half-silvered mirror 60 and two cylindrical lenses 62, 64. In operation the expanded laser beam is reflected by the first mirror 56 to the half-silvered mirror 60 which reflects part of the beam to one cylindrical lens 62 and which transmits the remainder of the beam which is reflected by the second mirror 58 to the other cylindrical lens 64. The cylindrical lenses 62, 64 each produce a beam of light of elongated cross section, and slightly divergent, i.e. forming a narrow fan and each constituting one half of a multiplication cross, as indicated at references 66, 68. Close to the unit the beams are separate but at all practical working distances the beams overlap to provide a single beam having an X-shaped cross section.

It is an advantage of this general optical arrangement that the beams maintain their relative position to form a 90° cross irrespective of any wobble of the device about the vertical axis.

Referring again to FIG. 4, the optical unit is attached by an axle 26 through a gearbox 70 to the motor 28; the axle 26 also carries the glass angle digitising disc 30 which rotates beneath a disc reading head 72 which is connected to a radio frequency transmitter 74 having an antenna 32.

As the motor rotates the optical unit 24, the beams from the lenses 62, 64 are rotated to define a horizontal plane taken as the centre of the "X" cross; as the disc 30 is rotated by the same axle, the reading head 72 senses the calibration marks, providing a train of pulse signals with each pulse corresponding to an equal angle of rotation, and the antenna emits a correspondingly modulated r.f. signal. Although the measurement of angle could be made in other ways, e.g. by timing a beam rotating at a constant speed, it has been found that this arrangement, in which the pulsed signal is linked to the actual rotation of the beam, provides accurate results.

The beam of X-shaped cross section formed by the two cylindrical lenses diverges at an angle determined by the cylindrical lenses; typically the diameter is 6 meters at a range of 70 meters.

The thickness of the beam forming each arm of the X-cross first decreases then increases in order to optimise the sharpness of the triggering effect at the sensors; typically diameters are 5 millimeters maximum with a 3.5 millimeter waist. Preferably the beam thickness is a minimum at half the maximum working range of the instrument. The thickness is controlled by the beam expander. To maximise accuracy, it is possible by provision of additional apparatus (not illustrated) to compute the range R and transmit a signal to a device controlling the beam expander to focus the laser, i.e. provide minimum thickness at the measured range.

Figure 6A:
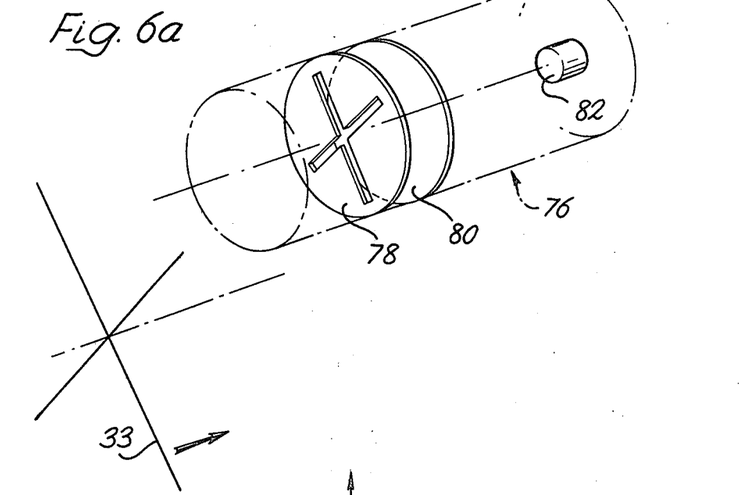
FIG. 6(a) shows a suitable sensor for an X-shaped beam and FIG. 6(b) the received signal.
Figures 6B, 8:
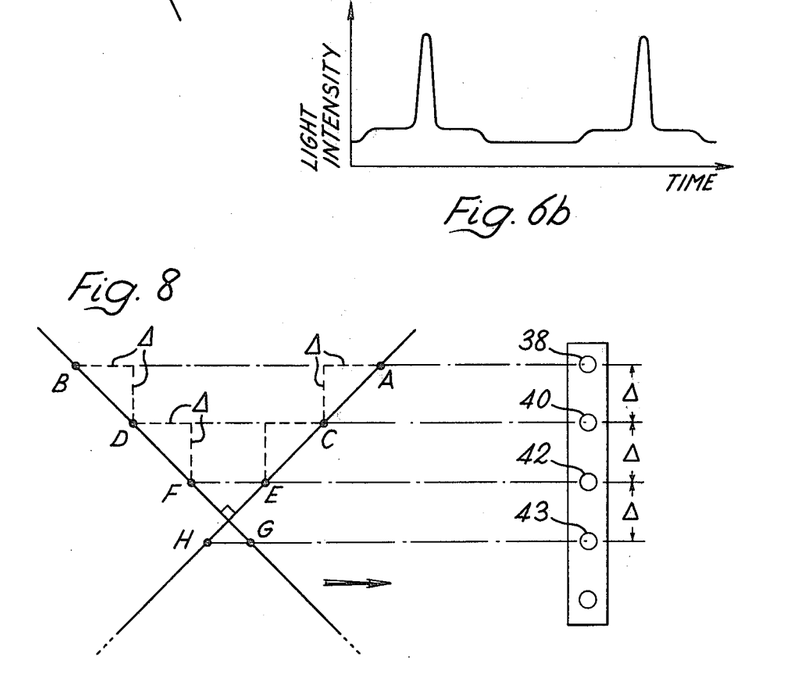

A typical beam rotation rate is 1 Hz; the beam crosses a sensor on the staff at the maximum range in about 20 microseconds and it is therefore preferable to maximise the received signal without losing positional accuracy. A suitable sensor configuration is shown in FIG. 6(a). The X-shaped beam 33 sweeps past the end of a tube 76 which contains an opaque mask 78 set some way along the tube; the mask has an X-shaped aperture which matches the beam 33 in inclination and orientation and behind the mask is a converging lens 80 which focuses light onto a photodetector 82 at the remote end of the tube. The shape of the received pulse is shown in FIG. 6(b). As the leading edge reaches the part of the aperture at right angles to its inclination, a low signal is received; when the leading edge reaches the part of the aperture which matches its inclination, a high intensity pulse of light of short duration falls on the detector 82; subsequently a low intensity signal is received as the leading edge passes across the other half of the transverse slot. A similar signal is received from the trailing edge. The two sharp pulses allow very accurate switching of the pulse counters and use of a detector of receiving area which is large compared to beam thickness without loss of definition.

Figure 7:
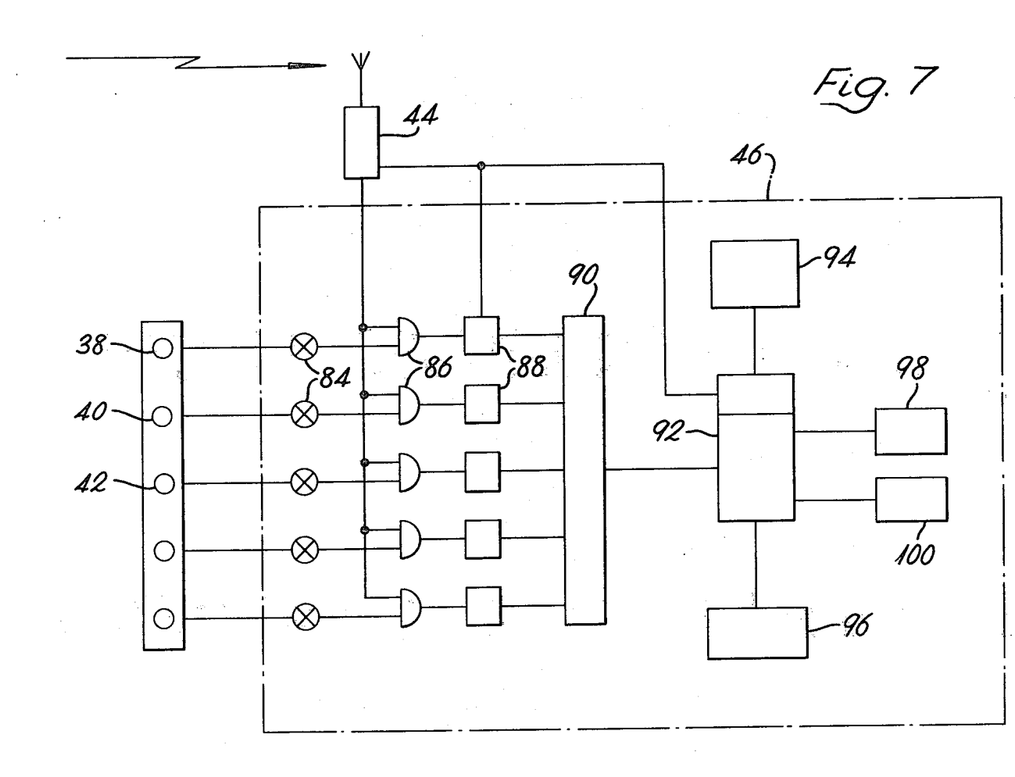
FIG. 7 is a schematic illustration of the electrical circuit.

The electrical circuit 46 is shown in FIG. 7. The R.F. receiver 44 and the three sensors 38, 40, 42 are also illustrated. The sensors are connected through individual toggled latches 84 to respective "AND" gates 86 which also receive pulsed signals from the R.F. receiver 44. The gate outputs are connected to individual pulse counters 88 which in turn are connected through an interface 90 to a control microprocessor 92. The microprocessor controls a display unit 94, a recording unit 96, an arithmetic unit 98 and a keyboard input unit 100.

In operation, the pulse signals from receiver 44 are supplied continuously to one side of the "AND" gates 86, but the gates permit passage of the pulses to the counters 88 only when the first signal is received from the corresponding sensor 38, 40 or 42. When a sensor provides a second signal, the "AND" gate is closed. The microprocessor then orders the appropriate calculation by the arithmetic unit 98 using the counts in two appropriate counters and information from its own ROM store relating to detector spacing and divergence angle of the leading and trailing edges. The results are displayed in unit 94, so that the instrument operator is kept informed, and the results are also stored. The keyboard allows the stored measurements to be coded and therefore linked to ground position.

To determine angular distance, the staff 34 is placed at a nominal reference position. When the angular reference pulse is received, it is supplied to the microprocessor 92 which then causes the counter 88 associated with sensor 38 to start counting pulses. When the leading edge of the beam is received by sensor 38, the microprocessor causes the counter to count alternate pulses until the trailing edge is received. The total count is stored and can be used to calculate the angle in the reference plane between the direction corresponding to the reference pulse and the direction of the nominal reference position. This avoids the need for setting the nominal reference position and the direction of the reference pulse in precise alignment, therefore the reference pulse direction need not be known. Subsequently, the staff 34 is moved to another position, the pulse count between the reference pulse and detection of the leading edge by sensor 38 plus half the count between the leading and trailing edges is determined; this gives the angle between the reference direction and the current position of the sensor 38. Use of the stored count allows calculation of the angle between the nominal reference position, which is known, and the current sensor position.

Typical magnitudes and accuracies are a maximum range of 70 meters with measurements to an accuracy of 5 millimeters in height, 5 centimeters in range and 30 arc seconds in angular position. The vertical spacing of the sensors may be between 25 and 30 centimeters. The digitiser disc may produce 144,000 pulses per revolution which are transmitted on a 29 MHz carrier signal.

Considering the differences in values given by use of the time formula (Equation 1) and the approximations using angle measurements, for a 20 centimeter separation of the sensors and a multiplication cross 4 meters in diameter at 70 meters range, the errors introduced by the approximation are 0.3 millimeters in height and 1.8 centimeters in range.

The dimensions are chosen so that the vertical spacing of the sensors is a maximum, to give maximum accuracy in the measurements of height and range, with the limitation that there are preferably two sensors within half of the cross i.e. two sensors above or below the beam centre receive the beam.

Several variations of the illustrated apparatus are possible. For example, the invention has been described with reference to an X-shaped beam with one sensor above and one below the centre of the X. In some circumstances, both sensors may be either above or below the centre when equations (2) and (3) have the slightly different forms:

$$h = \frac{\Delta}{\left[\frac{\sin \alpha/2}{\sin \beta/2} - 1\right]} \text{ and} \tag{4}$$

$$R = \frac{\Delta \tan \alpha}{\sin \frac{\alpha}{2} - \sin \frac{\beta}{2}} \tag{5}$$

The microprocessor therefore needs to know which of the two pairs of equations to apply. The solution again lies in simple geometry. Referring to FIG. 8, if an X-shaped beam with 90° angles is used, and the vertical spacing of sensors 38, 40, 42 is $\Delta$ as before, then inspection shows that the difference between the lengths of chords AB and CD is $2\Delta$. Similarly the difference between chords CD and EF is $2\Delta$, because all three sensors are above the cross centre. However, at an additional sensor 43 below the cross centre the length difference between the chord lengths EF and GH is not $2\Delta$ but is always less than $2\Delta$, depending on the relative position of the cross centre.

Since the pulse count (which is a measure of angle) corresponding to a particular chord length varies with range, the count values themselves cannot be used to check if the differences correspond to $2\Delta$. It is therefore necessary to compare the count differences between consecutive pairs of three adjacent detectors; if the count differences are identical, then all three sensors are either above or below the cross centre and the beam is effectively "V" shaped. If one count difference is less than the other, then the cross centre lies between the pair of sensors giving the lower count difference.

The microprocessor applies this test and then selects the appropriate equations, either (2) and (3) or (4) and (5).

It is also possible to provide a beam which has an actual "V" shaped cross section. The above test is then not needed. In another variation the leading and trailing edges converge towards a point defining the horizontal plane, but do not actually meet or intersect.

In practical situations it is usually best to make several measurements at each field point, e.g. 10 measurements, and to average them. Thus a time corresponding to more than ten revolutions of the laser beam is required, but the accuracy is improved. Alternatively the highest and lowest reading can be averaged.

Another method of increasing accuracy is to have several sensors, e.g. five as shown in FIGS. 7 and 8, and to use the pulse counts corresponding to the highest and lowest sensor on the staff which receives the beam. This maximises accuracy while allowing for the facts that the beam diameter varies with range and that the heights of the field points may vary considerably. The provision of a cursor on the staff to carry the sensors is also a useful feature if the heights of the field points vary.

Figures 9, 10:
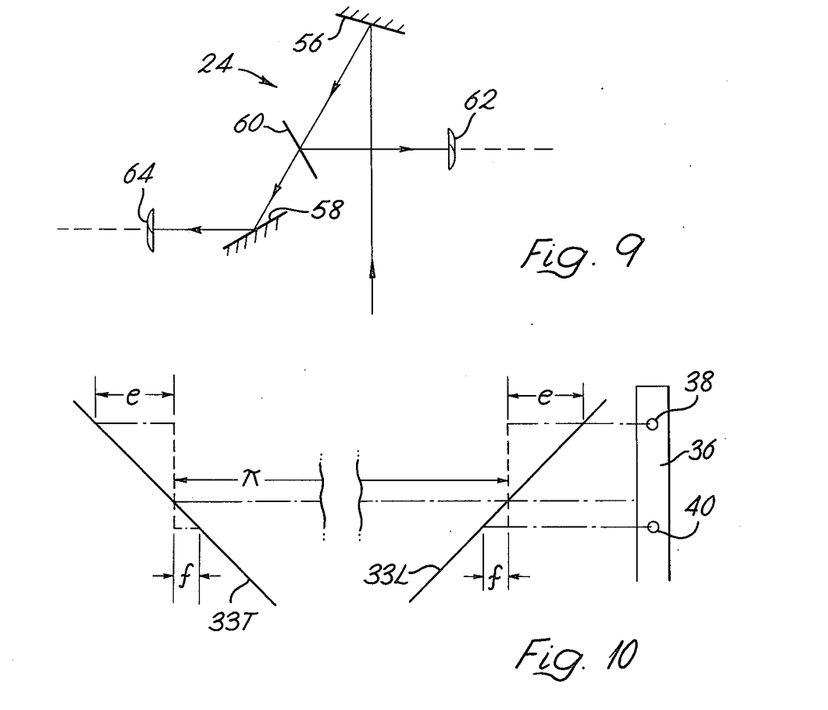
FIG. 9 shows an alternative arrangement to FIG. 5.
FIG. 10 illustrates a beam in which the leading and trailing edges are rotated 180° out of phase.

In another variation, the optical arrangement illustrated in FIG. 5 is varied, see FIG. 9. The mirror 58 is rotated and the lens 64 displaced so that the optical unit 24 produces two beams rotated 180° out of phase, each beam producing one half of an X shaped beam. The trailing edge then lags the leading edge by, on average, $\pi$ radians and the pulse count calculations are modified to allow for this difference. The advantage of such an arrangement is that only two detectors are required.

The corresponding geometrical arrangement is illustrated in FIG. 10. The two halves of the X-shaped beam rotate with a separation of $\pi$ radians. The position of the notional crossing point of the beams still needs to be known because it determines the height of the horizontal reference plane.

If the half-beams sweep across the two sensors 38, 40 from left to right, the leading edge 33L reaches the upper sensor 38 "earlier" than the position of the crossing point by a time $\tau_e$ corresponding to distance e, and the leading edge reaches the lower sensor "later" than the crossing point by a time $\tau_f$ corresponding to distance f. Similarly the trailing ege 33T reaches the lower sensor 40 "early" and the upper sensor "late" by times corresponding to $\tau_e$ and $\tau_f$. If the angle between the two half beams is $\tau$ radians, equivalent to a count $\tau$, then the counter associated with sensor 38 counts $\tau + \tau_e + \tau_e$ and the counter associated with sensor 40 counts $\tau - \tau_f - \tau_f$. By subtraction of the count $\tau$ the sign of the count associated with the sensors is found; this indicates whether or not the sensors are both above or below the reference plane, and therefore which pair of equations (2) and (3) or (4) and (5) should be used to calculate the position of the sensors with respect to the reference plane.

Many variations can be made to the described apparatus. For example, in either FIG. 5 or FIG. 9, the mirror arrangements are equivalent to use of pentaprisms. Such prisms may also be provided in practice. Also, a self-seeking cursor may be used, plus a display device to indicate to the operator which sensors are receiving a beam.

In the above description, an X-shaped cross with right angles between the arms has been used as an example. To minimise the error in the pulse count between e.g. the two upper arms by maximising the pulse count, the angle between these arms can be increased giving a St. Andrews cross shaped beam. A disadvantage is that the pulse signals illustrated in FIG. 6(b) are then widened so that the stop and start signals to the pulse counters are less well defined. Also, the vertical height of the beam is reduced and a maximum vertical sensor spacing is required.

The invention has been described with reference to visible radiation, but ultraviolet or infra red beams could be used in conjunction with suitable sensors.

While it is an advantage of the use of an instrument according to the invention that it can be operated by one person, it is also possible to use several staffs, each with an array of sensors and a microprocessor etc., to make measurements of many points simultaneously.

Uses other than in land surveying are also possible, for example in large-scale engineering such as shipbuilding and in the siting of machine beds and similar mechanical engineering applications. When shorter operating ranges are involved than in the examples given above, a smaller beam can be used and much higher precision can be achieved.

We claim:

1. Position sensing apparatus comprising generating means (12) for generating a beam of radiation; rotation means (24) for rotating the beam to define a reference plane, characterised by the beam having an effective sectional shape such that a leading edge and a trailing edge are straight and diverge from each other on at least one side of the reference plane; at least two radiation sensors (38, 40) spaced a known distance apart in a direction parallel to the axis of rotation of the beam; and means (30, 32, 44, 46) for determining the distances between the leading and trailing edges at the positions along those edges which pass across each sensor whereby the distance of each sensor from the reference plane and the distance of the sensors from the axis of rotation can be determined.

2. Position sensing apparatus according to claim 1 in which a beam of visible radiation is rotated about a vertical axis to define said reference plane as a horizontal reference plane, the beam having an actual section which is "V" shaped.

3. Position sensing apparatus according to claim 1 in which a beam of visible radiation is rotated about a vertical axis to define said reference plane as a horizontal reference plane, the beam having an actual section which forms a multiplication cross.

4. Position sensing apparatus according to any preceding claim in which the means for determining the distances between the leading and trailing edges at each sensor comprises means (30, 32, 44, 46) for determining the angles subtended at the axis of rotation by said distances, the angles being less than 5°.

5. Position sensing apparatus according to claim 4 in which the means for determining said angles comprises pulse generating means (30, 72) for providing a train of pulses, each pulse corresponding to an equal subdivision of the 360° rotation of the beam; and pulse counting means (88) for counting the number of pulses generated between passage of the leading and trailing edges of the rotating beam at each sensor.

6. Position sensing apparatus according to claim 5 further comprising means (30, 72) for generating a reference pulse at a fixed angular position with respect to rotation of the beam, and pulse counting means (88) for counting the number of pulses generated between the reference pulse and a position midway between the leading and trailing edges at one sensor, whereby the angular distance of that sensor from a direction corresponding to the reference pulse can be determined.

7. Position sensing apparatus according to claim 5 further comprising calculating means (92, 98) for calculating from the counted pulses at least one of three distances which define a sensor position.

8. Position sensing apparatus according to claim 1 in which two partial beams of visible radiation are rotated about the same vertical axis, one partial beam constituting a leading edge and the other partial beam constituting a trailing edge, the trailing edge lagging the leading edge.

* * * * *